(12) United States Patent
Kalden et al.

(10) Patent No.: US 7,417,966 B2
(45) Date of Patent: Aug. 26, 2008

(54) TBF BI-DIRECTIONAL OPTIMIZATION FOR TCP

(75) Inventors: Roger Kalden, Neuss (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 919 days.

(21) Appl. No.: 10/370,861

(22) Filed: Feb. 21, 2003

(65) Prior Publication Data

US 2003/0156557 A1    Aug. 21, 2003

(30) Foreign Application Priority Data

Feb. 21, 2002    (EP)    ................................. 02003259

(51) Int. Cl.
| | |
|---|---|
| H04Q 7/00 | (2006.01) |
| H04Q 7/28 | (2006.01) |
| H04Q 7/20 | (2006.01) |
| G08C 25/02 | (2006.01) |
| H04B 7/212 | (2006.01) |

(52) U.S. Cl. ........................ 370/329; 370/341; 370/348; 455/450; 714/748

(58) Field of Classification Search ........................ None
See application file for complete search history.

(56) References Cited

U.S. PATENT DOCUMENTS

| | | | | |
|---|---|---|---|---|
| 5,084,877 | A * | 1/1992 | Netravali et al. | 714/748 |
| 6,701,151 | B2 * | 3/2004 | Diachina et al. | 370/329 |
| 6,754,200 | B1 * | 6/2004 | Nishimura et al. | 370/349 |
| 6,813,280 | B2 * | 11/2004 | Vanttinen et al. | 370/349 |
| 6,847,633 | B1 * | 1/2005 | Ryu et al. | 370/352 |
| 7,092,373 | B2 * | 8/2006 | Parantainen et al. | 370/337 |

FOREIGN PATENT DOCUMENTS

| | | |
|---|---|---|
| EP | 1 148 689 A1 | 10/2001 |
| WO | WO 01/58095 A1 | 8/2001 |
| WO | WO 01/91078 A1 | 11/2001 |
| WO | WO 01/99353 A1 | 12/2001 |

* cited by examiner

*Primary Examiner*—Steven Nguyen
(74) *Attorney, Agent, or Firm*—Thomas Bethea, Jr.

(57) ABSTRACT

In a data communication network (SYS) a first and second network site (BSS), (MS) communicate by sending a first data transmission (DT1) from the first network site (BSS) to a second network site (MS) and by sending a second data transmission (DT2) from said second network site (MS) to said first network site (BSS). In accordance with the invention data transmission characteristics (DTC1) of said first data transmission (DT1) are determined and radio resources for said data transmission (DT2) are allocated based on the determined first data transmission characteristics (DTC1). Thus, the radio resources for the second data transmission (DT2) are correlated with characteristics of the first data transmission (DT1) and thus delays in the data transmission between the first and second network site (BSS, MS) can be avoided. The invention finds particular application in data transmission networks, for example in a TCP/IP network, in which a link layer protocol context, for example a Temporary Block Flow (TBF), has to be set up for the data transmissions. In such applications the invention can reduce the data packet transmission delay by avoiding unnecessary TBF setup/tearing down procedures.

4 Claims, 11 Drawing Sheets

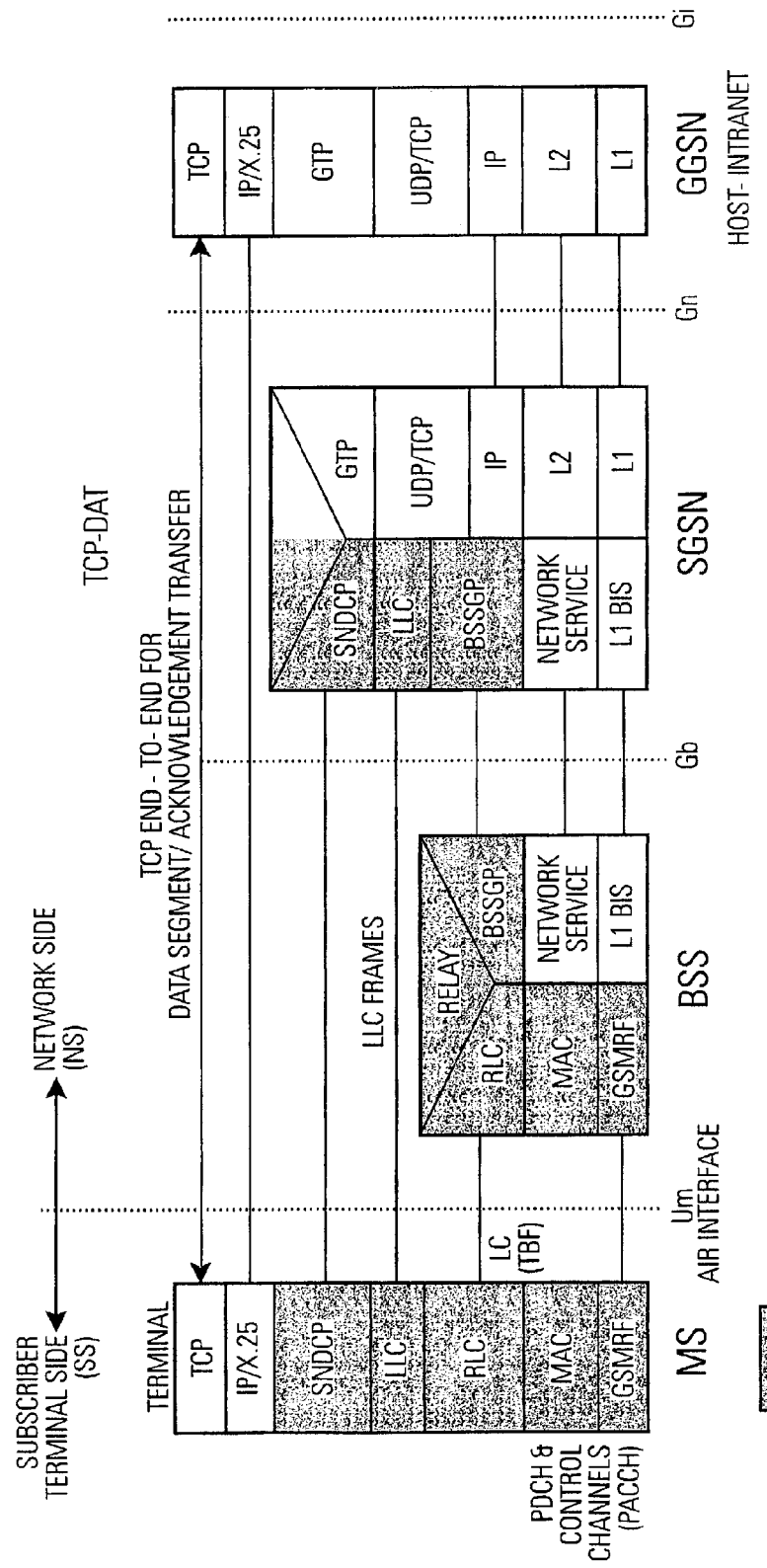

DATA TRANSMISSION SCENARIOS

TBF BI-DIRECTIONAL OPTIMIZATION FOR TCP

CROSS-REFERENCE TO RELATED APPLICATIONS

This application claims the benefit of the filing date as provided by 35 U.S.C. 119 of European patent application number 02003259-5 filed on Feb. 21, 2002, the disclosure of which is incorporated herein by reference.

FIELD OF THE INVENTION

The invention relates to a method and a network unit for allocating transmission resources in a data communication network.

BACKGROUND OF THE INVENTION

One example of a data communication network in which the invention can be used is EGPRS or GPRS, in which a so-called link layer protocol context (TBF) is set up between a transmitting network site and a receiving network site and in which a further link layer protocol context (TBF) is set up for the data transmission from the second network site to the first network site. This link layer protocol context is called Temporary Block Flow (TBF) in GPRS and EGPRS.

If a TBF in EGPRS or GPRS has been set up, a scheduler assigns the necessary radio resources for transmitting a single data packet via the air interface. As will be briefly explained below, typically in TCP data transmission, each data transmission in one direction is confirmed by an acknowledgement transmission in the reverse direction and each direction needs the setting up and tearing down of a TBF. The setting up and tearing down of the TBF is conventionally controlled by the number of data packets to be transmitted.

The setting up and tearing down of a TBF requires a large amount of signalling between the two network sites and thus there may be quite a substantial delay when data packets or acknowledgement information is to be transmitted and a TBF has not been set up already. Furthermore, since the only criterion which causes the setting up of a TBF is the number of packets to be transmitted, there may occur a situation where after transmission of a few data packets the TBF is cancelled and has to be set up again if after only a short period of time a new set of data packets is pending to be transmitted. Alternatively, if the TBF was just kept open unconditionally, i.e. even in cases where no acknowledgment or data packets need to be transmitted, this would cause a substantial waste of resources. The present invention aims to reduce this waste of transmission resources and in particular the invention aims to reduce delays during the transmission due to unnecessary TBF set up and tear down procedures.

FIG. 1a shows a typical data communication network SYS comprising a first network site, for example a base station system BSS, and a plurality of second network sites, for example a plurality of mobile stations MS, MS', MS". As explained above, typically there is a downlink DATA-DWN, on which a data transmission from the first network site BSS to the second network site MS occurs if simultaneously the downlink layer protocol context TBF-DWN is established. Likewise, if an uplink layer protocol context TBF-UP is established, a transmission of data can occur on an uplink DATA-UP. That is, for each transmission direction a link layer protocol context TBF must be established.

A well-known protocol for such data transmissions is TCP, which provides connection-oriented services for the application layer of the Internet protocol. A transmitting network site and a receiving network site establish a connection in order to exchange data and TCP transmits data in segments, which are encased in IP datagrams. Check sums are used to detect data corruption. In addition, sequence numbers ensure an ordered byte stream.

As shown in FIG. 1b, in TCP each data transmission ST1, ST3, ... between a TCP host and a TCP terminal requires the receiving network site, i.e. the TCP terminal, to acknowledge the receipt of data by returning acknowledgements ST2, ST4 to the transmitting site, i.e. to the TCP host. This acknowledgement confirms the receipt of data and its completeness. Since each data transmission is confirmed with an acknowledgement re-transmission TCP is considered to be a very reliable transport mechanism, in particular for large data streams. If the transmitting site does not receive an acknowledgement information from the receiving site within an expected time frame, the segment (IP datagram) is re-transmitted. It should be noted that TCP-IP as explained above is only one example of a protocol where a transmission of acknowledgments is performed. The present invention, however, is not limited to TCP-IP. For example, it may even be applicable to UDP, i.e. for constant stream arrival.

FIG. 1c in connection with FIG. 2 shows the general data transmission of FIG. 1b on a more detailed protocol layer. In FIG. 2, showing the protocol stack of a typical GPRS system, the nodes SGSN and GGSN as well as the base station system BSS can be considered to belong to the host site whereas the terminal MS can be considered to belong to the terminal site. Independently as to what kind of "data" is transmitted from the TCP host to the TCP terminal in step ST14 in FIG. 1c (it can be real user data or acknowledgement data) and independently as to what kind of data is transmitted from the TCP terminal to the TCP host in step ST24 (the data can be real user data or acknowledgement data), the downlink transmission and uplink transmission, respectively, require the set-up of a TBF in operations ST13 and ST23, respectively, after TCP packets forwarded in the respective steps ST11, ST21 have been encapsulated in LLC frames at the IP in steps S12 and S22, respectively. The TBF is set up between the respective RLC layers of host and terminal as indicated with the steps ST13, ST23. After de-encapsulation from the LLC frames in steps ST15, ST25 the TCP packets are forwarded to the receiving site in steps ST16 (to the TCP terminal) and ST26 (to the TCP host). For example, step ST11 could involve the transmission of data in the downlink direction from the host to a terminal whilst in step ST26 acknowledgement data is returned from the terminal to the host.

FIG. 3 and FIG. 4 respectively show how the link layer protocol context TBF is established between the RLC layers. After steps S31, S32 (in FIG. 3) and steps S41, S42 (in FIG. 4) the respective downlink and uplink TBFs are set up. Then data transmission is possible in steps S33, S43, which is followed by acknowledgement transmissions in step S34, S44.

If after step S35 in FIG. 3 there are no more RLC segments from the transmitting site, there is the possibility that a timer keeps the TBF open for a certain time period and after step S36 the TBF is released on the transmitting site.

Similarly, during the uplink data transmission, a final acknowledgement information is returned in step S46 from the transmitting site BSS to the receiving site MS indicating that the uplink TBF should be released on the receiving site MS. Then, after step S47 the TBF is also released on the transmitting site BSS. More particularly, in FIG. 4 each uplink data transmission in step S43, S45 includes an indication CV of the number of remaining data packets to be transmitted from the terminal site MS and if there are no further data packets to be transmitted (CV=0 or CV≦15), the teardown procedure for the uplink TBF is started. FIG. 3 and FIG. 4 may be respectively viewed as the "TBF-DWN establishment" and "TBF-UP establishment" in steps ST13 and ST23 in FIG. 1c.

Thus, as shown in step S1 in FIG. 5a, a transmission reception unit TR/RC of the transmitting site (BSS or MS) receives/transmits data packets (downlink data transmission: DATA in downlink/acknowledgement in uplink; uplink data transmission: DATA in uplink/acknowledgment information ACK in downlink). As explained with reference to FIG. 3 and FIG. 4, the set up and teardown procedures for the respective TBF are only governed by the fact whether or not data packets are pending to be transmitted. For example, if the CV value (the value which indicates the remaining number of packets) gets smaller than 15, the TBF tear down procedure cannot be stopped any more.

Furthermore, of course a data transmission between a transmitting site and receiving site can only take place if sufficient radio blocks are available and have been assigned to the respective uplink and downlink transmission. That is, if there are packets to be transmitted, in step S2 a resource allocater ALLO (shown in FIG. 5b) assigns the necessary radio resources for the packet transmission. In GPRS, the BSS decides for the uplink as well as for the downlink direction, which control channel or data channel is used and which terminal MS (MS', MS") can use it. The BSS controls the access on the uplink PDCH (packet data channel) via a so-called Uplink State Flag USF and the so-called Relative Reserved Block Period RRBP in the header of the radio blocks. The USF in the downlink radio block indicates which terminal is allowed to use the corresponding radio block slot in the uplink direction. The mobile station or terminal receiving the downlink block can be different from the mobile station indicated by the USF for the uplink direction, i.e. every terminal MS listening on the PDCH reads the USF flag.

As may be understood from the above explanation, in data communication systems in which a link layer protocol context TBF needs to be established in the uplink direction and downlink direction for respectively transmitting data and acknowledgement information, a TBF has to be set up respectively in the uplink and downlink direction and resources are allocated by the first network site BSS (steps S1, S2 in FIG. 5).

However, the set up, the maintaining and the tearing down of TBFs and the allocation of radio resources (radio blocks) is only governed by the fact how many data packets are pending to be transmitted at a particular point in time from a transmitting site. For example, if in FIG. 1c a number of acknowledgment packets are pending to be transmitted from the TCP terminal to the TCP host (on the uplink direction) in response to one ore more data packets having been transmitted from the TCP host to the TCP terminal (in the downlink direction), the uplink TBF in step ST23 may be teared down after the last transmitted acknowledgement packet whilst there are still many more data packets being transmitted in the downlink direction. Thus, if a next acknowledgement data packet has to be transmitted in the uplink direction, the TBF has to be set up again, which causes an unnecessary overhead signalling and delay. The repeated set-up of a TBF could be avoided if the TBF was kept open (set-up) for a predetermined period of time to allow a transmission of acknowledgments at any time. However, this would cause an unnecessary waste of transmission resources.

As may be understood from this explanation, whilst the data packet transmission on the downlink and the downlink are quite clearly correlated, i.e. each data packet transmission in one direction is confirmed with an acknowledgement data packet transmission in the reverse direction, the actual adjustment of the radio resources is only made on the basis of pending data packets to be transmitted.

SUMMARY OF THE INVENTION

As explained above, in all transmission protocols in which a data (packet) transmission in one direction, e.g. from a host to a terminal in a downlink direction, is confirmed by an acknowledgement (packet) transmission in the reverse direction, e.g. from the terminal to the host, a TBF or similar needs to be set up for the transmission of the acknowledgment (packet) information. However, whilst the data and the acknowledgment transmission is somewhat correlated, i.e. each downlink data transmission is confirmed by the uplink acknowledgment transmission, the TBF set-up and tear down procedures are substantially uncorrelated to the transmissions themselves (e.g. the TBF control (set up/tear down) may be solely dependent on the number of packets to be transmitted which can cause a great delay of packet transmission between host and terminal). Since the TBF control is substantially uncorrelated to the actual up- and down transmissions, the transmission resources are not optimally used, e.g. resources may be unnecessarily allocated to the uplink even though no actual acknowledgment packet needs to be transmitted. On the other hand, as explained above, just keeping the TBF open over a certain period of time also causes a drastic waste of resources. Thus, all protocols in which a data transmission in one direction is confirmed by an acknowledgment transmission in the reverse direction, suffer from the disadvantage of the transmission resources not being allocated or used optimally.

Therefore, it is desirable to provide a method and a network unit in a data communication network which optimise the use of transmission resources for data transmissions between two communication network sites.

Embodiments of the Invention

One embodiment relates to a method for allocating transmission resources in a data communication network, comprising the following steps: receiving at a first network site a first data transmission having a specific data transmission characteristic; and allocating by said first network site transmission resources for a second data transmission in said communication network; determining at said first network site a first transmission characteristic information indicating said data transmission characteristic of said received first data transmission; and allocating by said first network site said transmission resources based on at least said first transmission characteristic information.

Another embodiment relates to a network unit for allocating transmission resources in a data communication network, comprising the following steps: receiving at a first network site a first data transmission having a specific data transmission characteristic; and allocating by said first network site transmission resources for a second data transmission in said communication network; determining at said first network site a first transmission characteristic information indicating said data transmission characteristic of said received first data transmission; and allocating by said first network site said transmission resources based on at least said first transmission characteristic information.

Thus, in the aforementioned embodiments the allocation of resources for the second data transmission is made dependent on the actual transmission characteristic of the first data transmission. Consequently, the allocation of resources is not just dependent on the number of data packets to be transmitted in a specific second transmission direction but the allocation of resources in the second transmission direction is correlated to the transmission characteristic of the first data transmission. Thus, the allocation of resources can be optimised. Another advantage is that unnecessary delays during the transmissions can be avoided.

FURTHER EMBODIMENTS

Further embodiments of the allocation method comprise the following embodiments.

In accordance with another embodiment said second data transmission is a data transmission transmitted by said first network site.

In accordance with another embodiment said second data transmission is a second data transmission transmitted by a second network site to said first network site.

In accordance with another embodiment said first data transmission is forwarded as a third data transmission to said second network site.

In accordance with another embodiment the timing at which said first data transmission is forwarded as said third data transmission to said second network site is determined at said first network site.

In accordance with another embodiment said allocating step d) comprises the steps in which said first transmission characteristic information is conveyed to said second network site; and the allocating of the transmission resources is carried out by said second network site for said second data transmission at least on the basis of said first transmission characteristic information.

In accordance with another embodiment, said allocating step d) comprises the steps in which a resource allocation information based on said first transmission characteristic information is conveyed to said second network site; and said allocating of the transmission resources is carried out by said second network site for said second data transmission at least on the basis of said resource allocation information.

In accordance with another embodiment said resource allocation information is also based on said determined timing.

In accordance with another embodiment, in addition to the determining of said first transmission characteristic information, said first network site also determines a second transmission characteristic information indicating a data transmission characteristic of said second data transmission received at said first network site.

In accordance with another embodiment, said second transmission characteristic information is also conveyed to said second network site; and said allocating step d) comprises the allocating of the transmission resources by said second network site for said second data transmission on the basis of said first and second transmission characteristic information.

In accordance with another embodiment, a resource allocation information based on said first and second transmission characteristic information is conveyed to said second network site; and said allocating step d) comprises the allocating of the transmission resources by said second network site for said second data transmission on the basis of said resource allocation information.

In accordance with another embodiment, said determining step c) comprises the step of receiving said first transmission characteristic information at said first network site.

In accordance with another embodiment, said determining step c) comprises the step of analysing said received first data transmission for said transmission characteristic.

In accordance with another embodiment, said first data transmission is a data packet transmission and said first data transmission characteristic information indicates whether data packets are transmitted in said first data transmission.

In accordance with another embodiment, said second data transmission comprises acknowledgement information for data packets transmitted in said first data transmission.

In accordance with another embodiment said first data transmission characteristic of said data packet transmission comprises one or more selected from the group consisting of the number of data packets, the sequence of data packets, pauses between the data packets, the data packet type indicating the type of the data packet and the application type indicating the type of application (e.g. WAP) generating the data packet.

In accordance with another embodiment, said resource allocation step comprises the allocating of a link layer protocol context between the first network site (BSS) and a second network site.

In accordance with another embodiment, said resource allocation step is performed by scheduling of radio resources needed for the second data transmission. Hereinafter, further embodiments of the network unit are listed.

According to another embodiment said second data transmission is a second data transmission transmitted by a second network site to said first network site.

According to another embodiment a forwarding unit is adapted to forward said first data transmission as a third data transmission to said second network site.

In accordance with another embodiment a timing unit on the first network site is adapted to determine the timing at which said first data transmission is forwarded as said third data transmission to said second network site by said forwarding unit.

According to another embodiment said allocater is adapted to convey said first transmission characteristic information to said second network site for having the transmission resources allocated by said second network site for said second data transmission at least on the basis of said first transmission characteristic information.

According to another embodiment said allocater is adapted to determine a resource allocation information based on said first transmission characteristic information and to convey this resource allocation information to said second network site for having the transmission resources allocated by said second network site for said second data transmission at least on the basis of said resource allocation information.

According to another embodiment, said allocater is further adapted to determine said resource allocation information also based on said determined timing.

According to another embodiment said transmission characteristic determiner, in addition to the determining of said first transmission characteristic information, is further adapted to also determine a second transmission characteristic information indicating a data transmission characteristic of said second data transmission received at said first network site.

According to another embodiment said allocater is further adapted to also convey said second transmission characteristic information to said second network site for having the transmission resources allocated by said second network site for said second data transmission on the basis of said first and second transmission characteristic information.

According to another embodiment said allocater is further adapted to determine a resource allocation information based on said first and second transmission characteristic information and to convey this resource allocation information to said second network site for having the transmission resources allocated by said second network site for said second data transmission on the basis of said resource allocation information.

According to another embodiment said transmission characteristic determiner is further adapted to receive said first transmission characteristic information at said first network site.

According to another embodiment said transmission characteristic determiner is further adapted to analyse said received first data transmission for said transmission characteristic.

According to another embodiment said receiver receives as said first data transmission a data packet transmission and said transmission characteristic determiner is adapted to determine as said first data transmission characteristic information whether data packets are transmitted in said first data transmission.

According to another embodiment said receiver receives as said second data transmission acknowledgement information for data packets transmitted by said transmitter in said first data transmission.

According to another embodiment said transmission characteristic determiner is adapted to determined as said first data transmission characteristic of said data packet transmission comprises one or more selected from the group consisting of the number of data packets, the sequence of data packets, pauses between the data packets, the data packet type indicating the type of the data packet and the application type indicating the type of application (e.g. WAP) generating the data packet.

According to another embodiment for allocating said transmission resources said allocater is adapted to allocate a link layer protocol context between the first network site and a second network site.

According to another embodiment for allocating said transmission resources said allocater comprises a scheduler adapted to schedule radio resources needed for the second data transmission.

According to another embodiment said communication network is a mobile radio communication network and said network unit of said communication network is a mobile station.

According to another embodiment said communication network is a mobile radio communication network and said network unit of said communication network is a base station system.

BRIEF DESCRIPTION OF THE DRAWINGS

In the drawings, the same or similar reference numerals denote the same or similar steps and features throughout. In the drawings:

FIG. 2 shows a typical GPRS protocol structure for a TCP data transmission;

FIG. 8b shows a block diagram of the first network site BSS and the second network site MS for the embodiment shown in FIG. 8a;

FIG. 9b shows a block diagram of the first network site and second network site for the embodiment in FIG. 9a;

FIG. 10b shows a block diagram of the first network site and the second network site for the embodiment in FIG. 10a.

DETAILED DESCRIPTION OF THE DRAWINGS

Although hereinafter sometimes reference is made to specific data communication networks which use TCP and in which a link layer protocol context TBF is set up in the downlink and uplink direction, it should be noted that the invention is by no means limited to data transmissions in a TCP/IP network. The invention is applicable to all data communication networks, in which a resource allocation for the respective uplink and downlink data transmissions is performed, and is independent from the fact whether it is based on TCP and/or whether it is based on a particular kind of transmission technique. Therefore, the invention is applicable but not limited to data transmissions using TDMA, CDMA, FDMA, OFDM, etc.

Furthermore, although hereinafter sometimes reference is made to the TCP link layer protocol context establishment in terms of a Temporary Block Flow TBF, it should be noted that by no means is the invention limited to a link layer context set up by a TBF. Any other layer protocol contexts may be considered in which the establishment of a link layer protocol context in an uncorrelated manner to the actual up- and down transmissions causes an inefficient use of transmission resources.

Furthermore, hereinafter, the invention is described sometimes with reference to a GPRS to a EGPRS system, however, the invention may be used in any other data communication network.

Furthermore, hereinafter a transmitting network site is sometimes referred to as a base station system BSS or a host whilst the receiving network site or second network site is referred to be a mobile station MS or a host. However, the first network site can be any other network unit in the data communication system and the second network site can also be any other network unit in the communication system. For example, the second network site may be a laptop, a personal computer, a palm top or a vehicle guidance system. Similarly, the first network site may be a central computer, a server, or any other unit in the data communication network.

Before coming to a more detailed description of the first embodiment of the invention, hereinafter, some definitions of transmission directions and definitions of first and second network site are given with reference to FIG. 6a, 6b. In the context of the present invention a network unit at a first network site is typically defined to be a base station system BSS as shown at ① in FIG. 6a. The first network site BSS receives a first data transmission DT1 and transmits a second data transmission DT2. Similarly, the network unit at a first network site may be defined to be a terminal, subscriber or mobile station MS1 as shown at ② in FIG. 6a. Thus, independently whether the first network unit is to be regarded as the BSS or the MS1, it receives a first data transmission DT1 and transmits a second data transmission DT2.

Figure 6A:
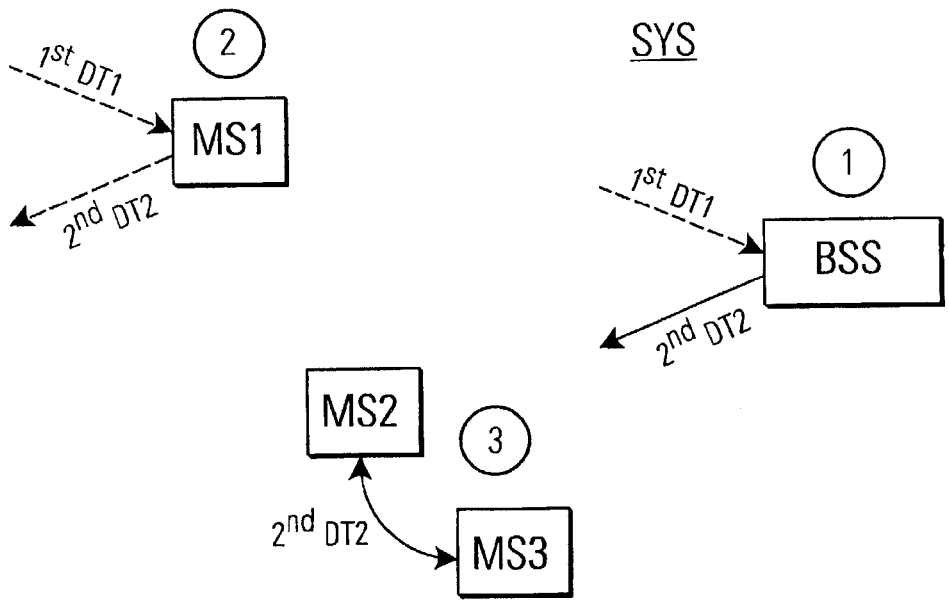
FIG. 6a shows several scenarios of first and second data transmissions considered by the invention.

As shown at ③ in FIG. 6a, a second data transmission DT2 may also be a data transmission between two terminals MS2, MS3. As shown in FIG. 6b, which illustrates a particularly advantageous embodiment of the invention, a first network site BSS communicates with a second network site MS and it receives a first data transmission DT1 from another network unit, for example from a gateway MSC GMSC. It receives a second data transmission DT2 from the second network site and it transmits a third data transmission DT3 to the second network site MS.

Therefore, in the scenarios ①, ②, ④, it should be understood that the first data transmission DT1 is a data transmission received from another network unit whilst the third data transmission DT3 is one, which is transmitted from the first network site BSS.

Therefore, in one embodiment of the invention the second data transmission DT2 can be a data transmission transmitted from the first network site MS or BSS. In accordance with another embodiment of the invention the second data transmission DT2 can be a second data transmission DT2 transmitted by a second network site MS to said first network site BSS. Furthermore, in accordance with another embodiment of the invention, the second data transmission DT2 can be a data transmission transmitted by a second network site MS1 to a third network site MS2. In accordance with yet another embodiment of the invention, the first data transmission DT1 is forwarded as a third data transmission DT3 from the first network site, e.g. BSS, to the second network site MS.

Furthermore, it should be noted that hereinafter reference is made often to the transmission of data packets, however, the invention is equally applicable to systems in which speech data is carried as the data of the data packets.

DESCRIPTION OF THE FIRST EMBODIMENT

Figure 7A:
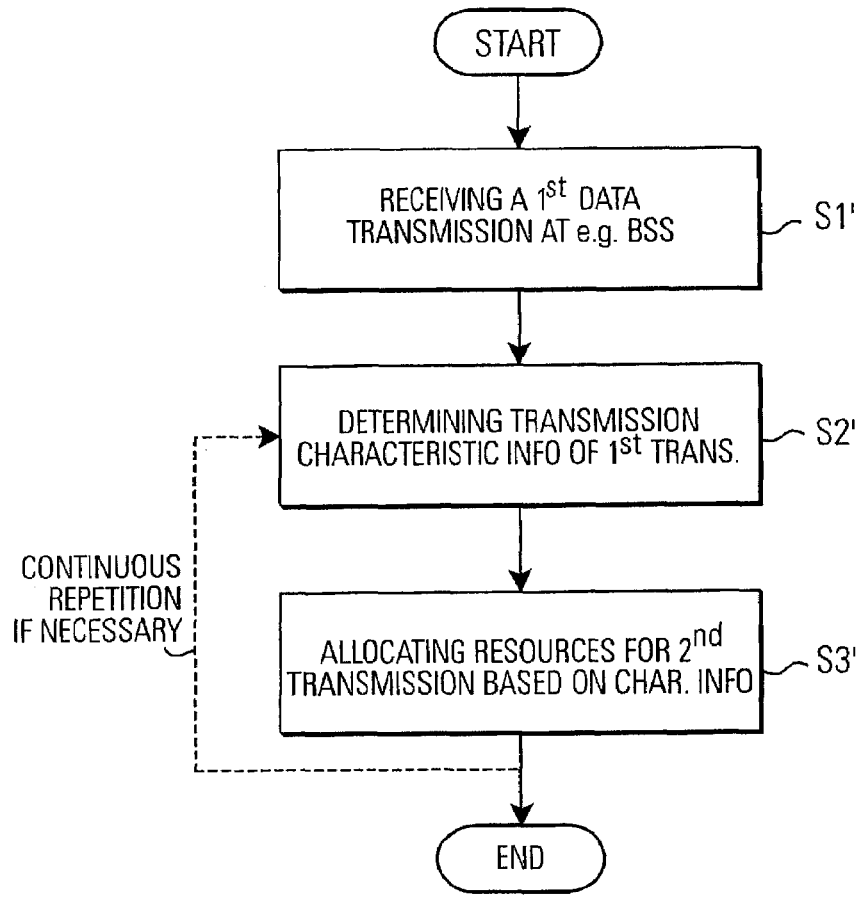
FIG. 7a shows a flowchart in accordance with one embodiment of the invention.
Figure 7B:
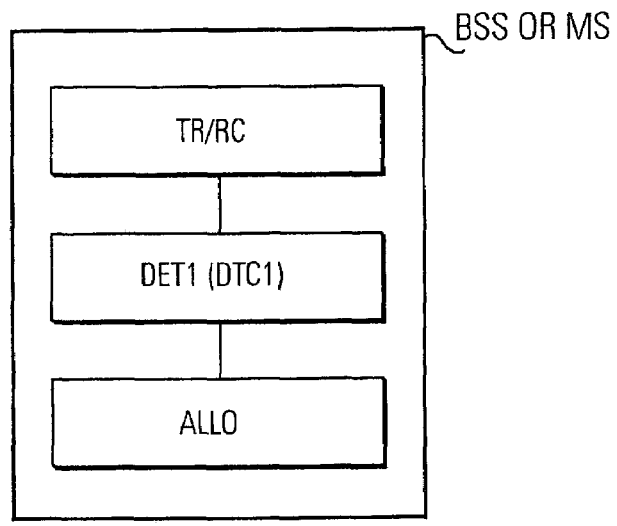
FIG. 7b shows a block diagram of a network site BSS or MS, in accordance with one embodiment of the invention.

FIG. 7a and FIG. 7b show a first embodiment of the method of the invention and of a network unit of the invention. As explained above, the flowchart in FIG. 7a is carried out on a first network site, which may be a base station system BSS or a mobile station MS. Similarly, FIG. 7b shows the network unit as the first network site which may be the BSS or the MS.

In step S1' a transmission/reception unit TR/RC, in particular its receiver RC, receives at the first network site (hereinafter the first network site is assumed to be the BSS) a first data transmission DT1 (as shown at ①, ②, ③, ④) in FIG. 6a, 6b). This first data transmission DT1 has a specific data transmission characteristic.

There are many examples of what this transmission characteristic can be and the characteristic will also depend on the respectively used transmission method between the first and second network site. For example, if the first data transmission is a data packet transmission, the first transmission characteristic information can indicate whether data packets are pending to be transmitted in the first data transmission. Thus, for example the first data transmission characteristic (hereinafter abbreviated also with DTC1) can relate to the number of data packets, pauses between the data packets, the data packet type indicating the type of the data packet and/or the application type indicating the type of application generating the data packet on the network site which originates the first data transmission DT1.

For example, the data packet type could be TCP and the application type could be WAP. A skilled person will realize many other types of transmission characteristics depending on the type of data transmission technique used between the first network site and the second network site.

Figure 5A:
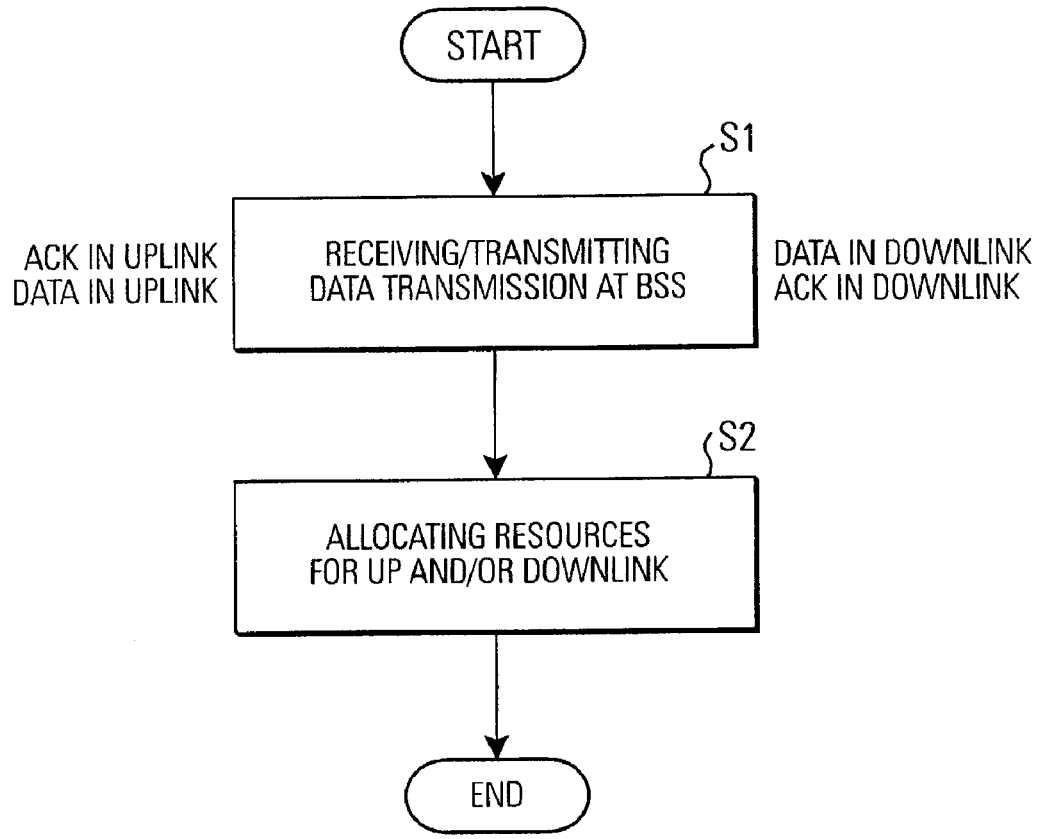
FIG. 5a shows a flowchart for allocating resources, in accordance with the prior art.
Figure 5B:
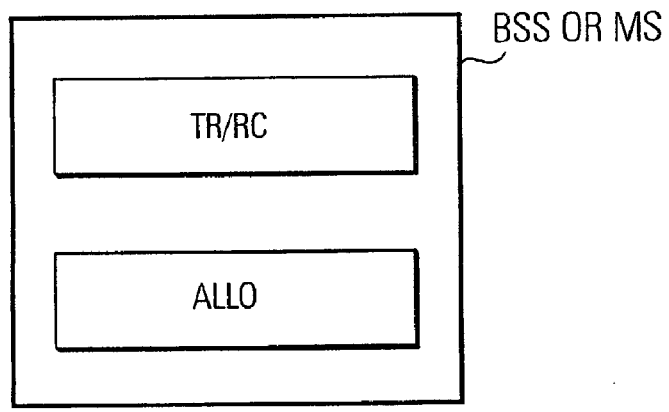
FIG. 5b shows an example of a network site BSS or MS, in accordance with the prior art.

The network unit at the first network site BSS or MS shown in FIG. 7b comprises, in addition to the units shown in FIG. 5b of the prior art, a transmission characteristic determiner DET1. This transmission characteristic determiner DET1 determines in step S2' a first transmission characteristic information DTC1. The first transmission characteristic information DTC1 indicates the data transmission characteristic of said received first data transmission DT1.

The allocater ALLO is, similarly as in the flowchart in FIG. 5a and the block diagram of FIG. 5b of the prior art, adapted for allocating transmission resources for the second data transmission DT2 in the communication network SYS. However, the allocater ALLO of the embodiment in FIG. 7b is adapted to allocate the transmission resources based on at least said first transmission characteristic information DTC1.

Thus, the allocation of transmission resources for the second data transmission TD2 is in accordance with this embodiment based on the transmission characteristics of the first data transmission DT1. Therefore, there is a correlation of the allocation of resources on the second data transmission DC2 dependent on the first data transmission characteristic DT1. Thus, any signalling necessary for the second data transmission is not solely dependent on whether or not data should be transmitted in the second data transmission, but it is dependent on the data transmission characteristic in the first data transmission direction. An example should illustrate the advantage of this embodiment.

Figure 3:
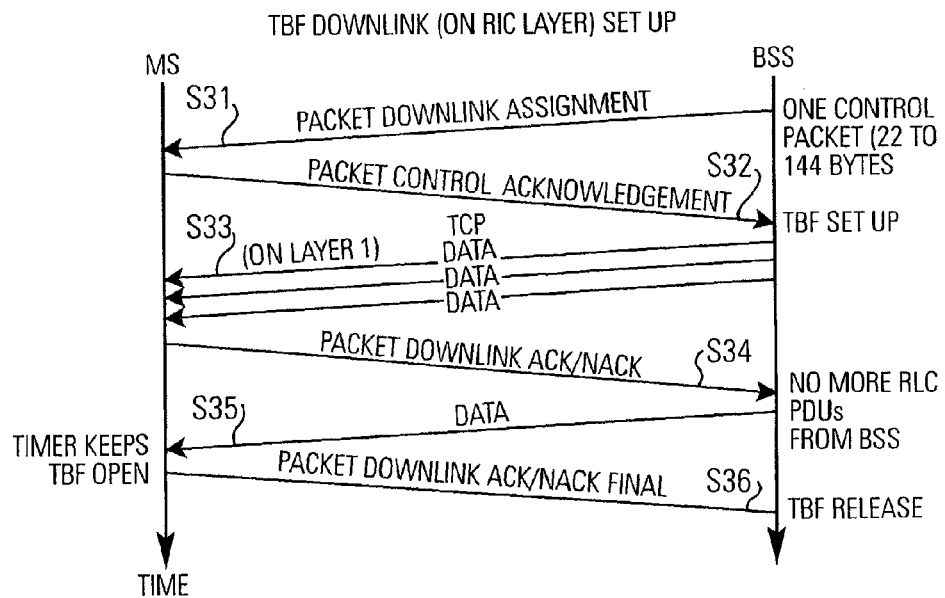
FIG. 3 shows signalling messages for a TBF downlink set up and teardown procedure, in accordance with the prior art.
Figure 4:
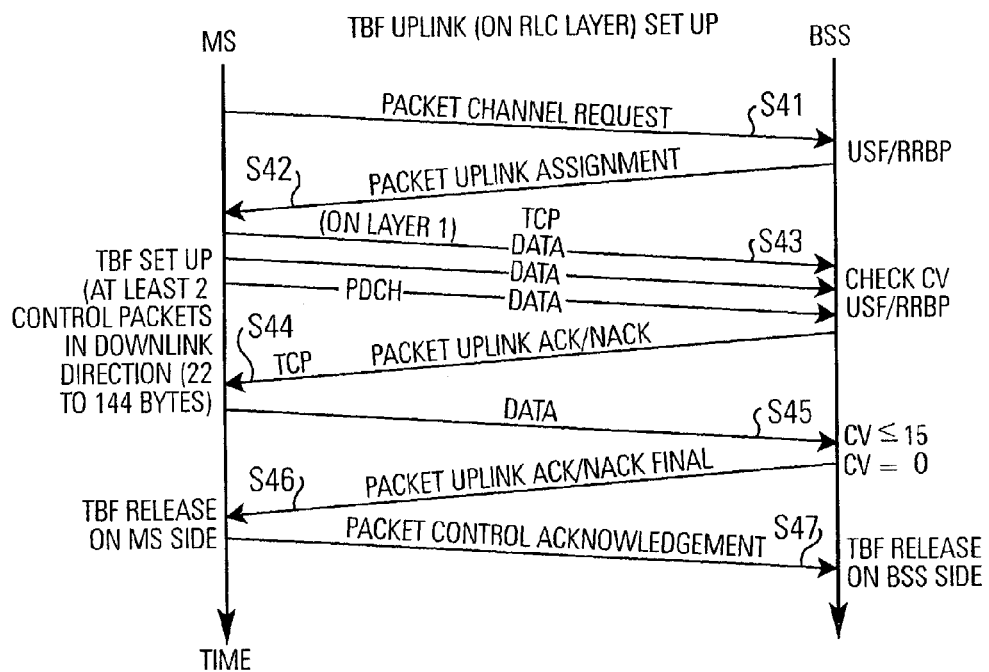
FIG. 4 shows signalling messages for a TBF uplink set up/tear down procedure.

Imagine the first network site to be the terminal site MS1 as in ② in FIG. 6a. For example, the first data transmission DT1 can be viewed as the data transmission in the downlink direction in FIG. 1c (TBF establishment in accordance with FIG. 3) and the second data transmission DT2 may be viewed as the uplink transmission in FIG. 1c (TBF establishment in FIG. 4).

Thus, the terminal site MS1 can adjust radio resources for the uplink transmission (second data transmission DT2) dependent on characteristics of the downlink transmission (first data transmission DT1). For example, if the TCP terminal (first network site) realizes that there is a large number of data packets coming downlink from the host, it can decide to allocate resources to keep the TBF uplink open as long as there are data packets coming on the downlink, because in the configuration in FIG. 1c every downlink data packet must be confirmed by an acknowledgement data packet in the uplink direction. Thus, unnecessary TBF set up/teardown procedures can be avoided, because the TBF uplink will be held open (maintained) as long as there are data packets coming on the downlink. Thus, the delays caused by the unnecessary set up/teardown of the uplink TBF can be avoided.

Thus, in accordance with the invention a correlation is established between the resource allocation in the second data transmission direction and the actual data transmission characteristic in the first data transmission direction.

DESCRIPTION OF THE SECOND EMDODIMENT

The afore-described example of the first embodiment relates to a scenario, where a network unit at the first network site receives the first data transmission and the resources are allocated for a second data transmission on the basis of the first data transmission characteristic.

Figure 8A:
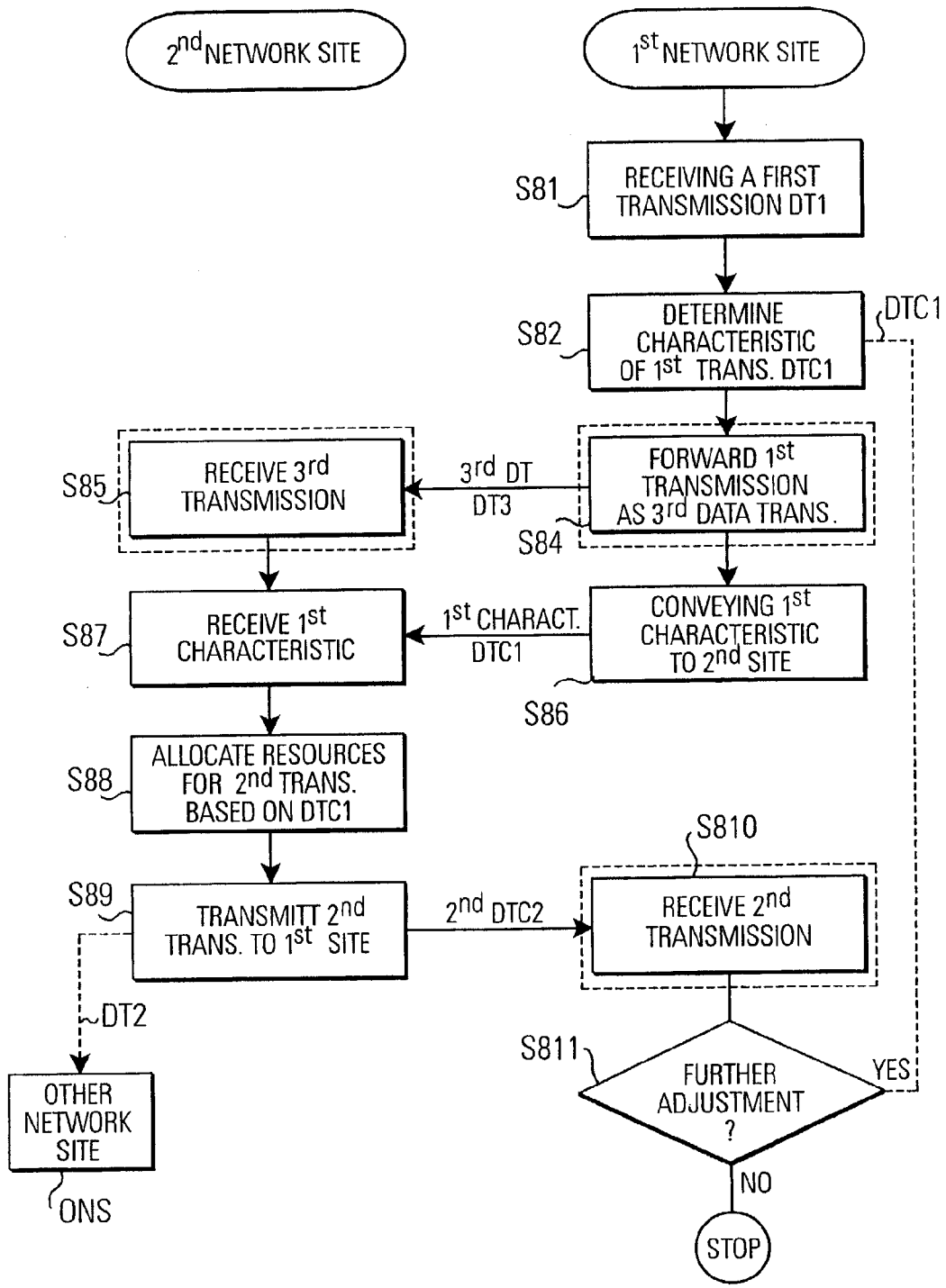
FIG. 8a shows an embodiment of the method in accordance with the invention when resources are allocated on the second network site after receiving a first characteristic transmission information DTC1 from the first network site.
Figure 8B:
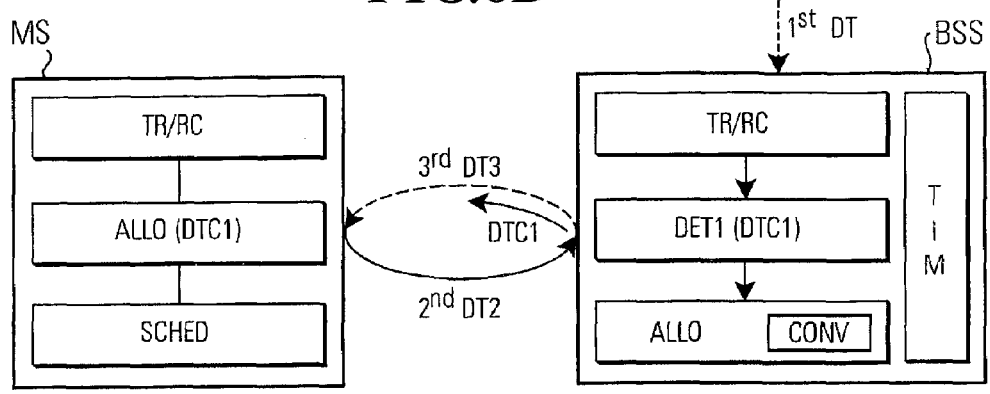

The second embodiment of the invention can relate to a case where the second data transmission is a second data transmission transmitted by a second network site to said first network site as shown in FIG. 8b and FIG. 8a. As indicated with dashed lines around the blocks S84, S85 in FIG. 8a, optionally the second embodiment comprises the forwarding of the first data transmission DT1 as a third data transmission DT3 to the second network site MS, as shown at ④ in FIG. 6b, by a forwarding unit CONV shown in FIGS. 8b, 9b and 10b.

As indicated with the box TIM in FIGS. 8b, 9b, 10b, in accordance with other embodiments of the invention, a timing unit TIM may be provided in the first network site BSS to determine the timing at which said first data transmission DT1 is forwarded as said third data transmission DT3 to said second network site MS by a forwarding unit CONV (to be described below). That is, depending on delay queues in the first network site BSS, the first data transmission DT1 may not be forwarded immediately (after being received at the first network site BSS) as said third data transmission to said second network site MS. Based on the knowledge about when the forwarding was done the first network site MS can perform a more appropriate allocation of resources based on this timing information.

As shown in FIG. 8a, the data transmission DT1 is received at the first network site similarly as in step S1' in FIG. 7a. In step S82 the first transmission characteristic determiner DET1 determines the first transmission characteristic information DTC1 of the first data transmission DT1.

In step S86 the transmission/reception unit TR/RC shown in FIG. 8b conveys the first transmission characteristic information DT1 to the second network site, for example to the mobile station MS. In step S87 the second network site receives the first data transmission characteristic DTC1 and in step S88 the resources are allocated for the second data transmission DT2 based on the received data transmission characteristic DTC1.

In step S89 the second data transmission DT2 is transmitted from the second network site to the first network site and the second data transmission DT2 is received in step S810 on the first network site. Of course, it should-be understood that there is a continuous first and second data transmission between the first network site and the second network site. Therefore, a continuous process can be carried out ("J" in step S811) if further adjustment of the allocation resources is desired. That is, continuously in step S82 the first characteristic information DTC1 is determined and is forwarded in steps S86, S87 to the second network site where a continuous adjustment of the resources for the second data transmission is performed in steps S88.

Then the second data transmission DT2 in step S89 is carried out with the readjusted transmission resources.

Although it was described with reference to FIG. 8a that the second data transmission DT2 is one which is transmitted from the first network site in step S89 to the first network site, in accordance with another embodiment the second data transmission DT2 may just be one which is transmitted from the second network site to yet another network site ONS shown in FIG. 8a. Of course, in this scenario steps S810, S811 are optional. That is, continuously, in step S82, the first data transmission characteristic is evaluated and the first transmission characteristic information DT1 is conveyed to the second network site and resources are allocated based on the received first data transmission characteristic DT1. Therefore, in FIG. 8a the boxes S810, S811 are framed with dashed lines indicating that they are optional. In this case the second data transmission DT2 is made to yet another network site ONS.

Figure 6B:
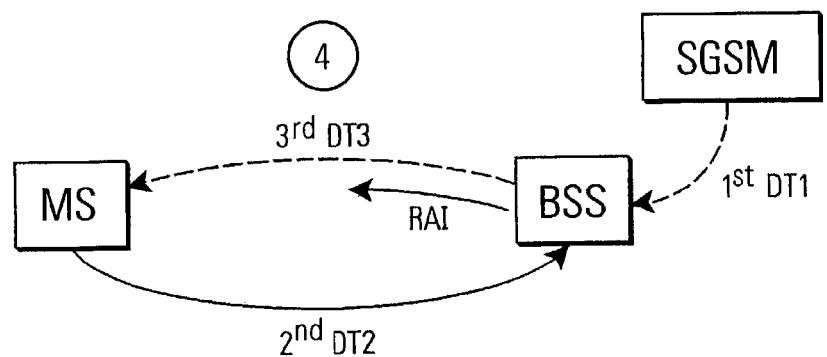
FIG. 6b shows a specific transmission scenario using first, second and third data transmissions.

As also indicated in FIG. 8a and in FIG. 6b, the first data transmission DT1 may be a first data transmission DT1 received from another network node, for example from a SGSN (Serving GPRS Support Node) or GGSN (Gateway GPRS Support Node). In accordance with another embodiment of the invention the first data transmission DT1 can be forwarded to the second network site MS in step S84 and this third data transmission DT3 is received at the second network site MS in step S85. The forwarding is done by a forwarding unit CONV incorporated in the transmission/reception TR/RC of the network unit BSS at the first network site.

As explained above in the example for the first embodiment, the third data transmission DT3 may be viewed, by the network unit MS on the first network site, as the first data transmission DT1, as shown at ② in FIG. 6a. Thus, it should be understood that each network unit in the data communication network SYS can perform the allocation of resources of a second data transmission based on transmission characteristics of the first data transmission.

THIRD EMBODIMENT OF THE INVENTION

Above it was already described that in step S86 in FIG. 8a the first data transmission characteristic DTC1 can be conveyed from the first network site to the second network site for having the resources allocated by the second network site on the basis at least of the first data transmission characteristic DTC1.

Figure 9B:
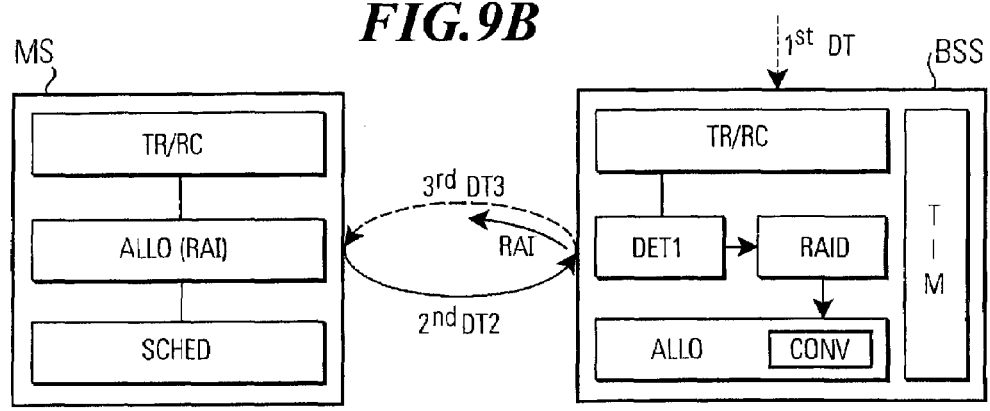
Figure 10B:
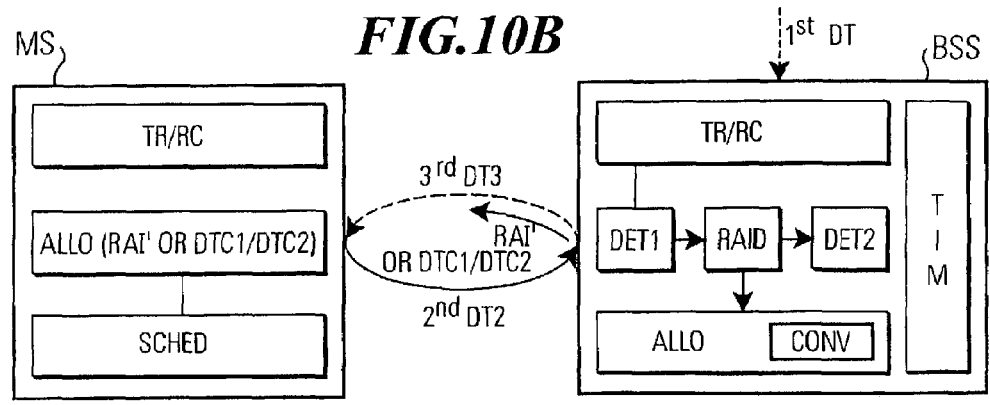
Figure 9A:
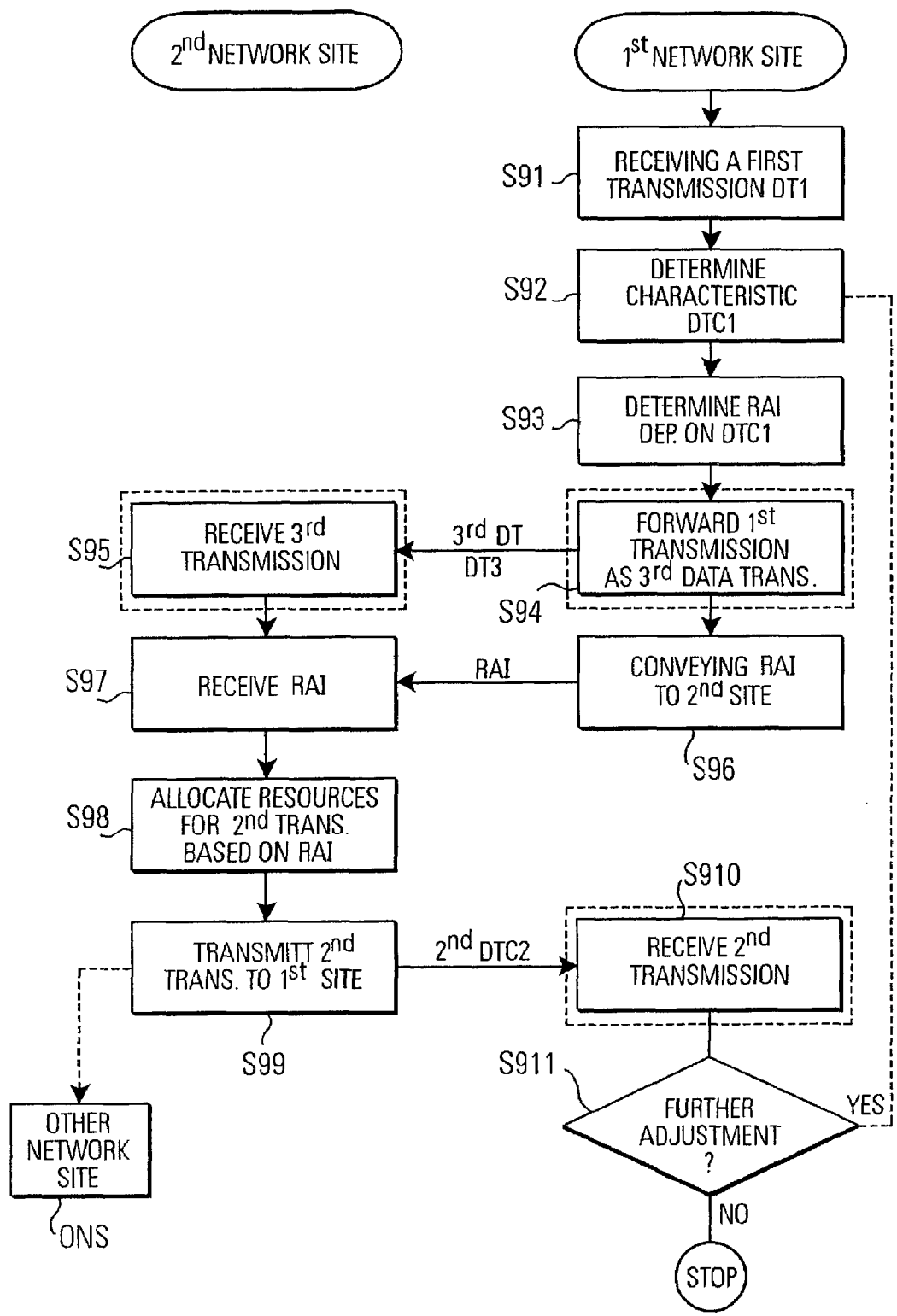
FIG. 9a shows another embodiment of the method of the invention in which a resource allocation information RAI is used for the resource allocation on the second network site.

FIG. 9a and FIG. 9b show a third embodiment of the invention where similarly as in the second embodiment of the invention the second data transmission at the second data transmission DT2 is transmitted by the second network site MS to said first network site BSS. However, as also indicated with dashed lines in FIG. 9a, the second data transmission can also be a second data transmission transmitted by said second network site MS to another network site ONS. In FIG. 9a steps S91, S92, S94-S911 correspond to the respective steps S81, S82, S84-S811 in FIG. 8a.

In FIG. 9b the network unit BSS on the first network site comprises the first transmission characteristic determiner DET1 for determining the first transmission characteristic information DTC1. That is, in FIG. 9a, step S92 comprises the determination of the first data transmission characteristic DTC1. In step S93 a resource allocation determination unit RAI determines a resource allocation information RAI based on said first transmission characteristic information DTC1 and in step S96, instead of transmitting the first transmission characteristic DTC1 as in step S86 in FIG. 8a, the conveying unit CONV of the allocater ALLO forwards the resource allocation information RAI to the second network site.

In step S97 the resource allocation information RAI derived from the first data transmission characteristic DTC1 is received at the second network site. In step S98 the allocater ALLO (RAI) of the network unit MS at the second network site performs the allocation of the resources for the second data transmission DT2 based on the resource allocation information RAI. In step S99 the transmission/reception unit TR/RC of the network unit MS transmits the second data transmission DT2 either to the first network site or to another network site ONS.

An example of the derivation of the resource allocation information RAI based on said first transmission characteristic DTC1 is as follows. For example, if the first data transmission characteristic is the number of packets of the first data transmission, the resource allocation information RAI can directly indicate to the second network site the number of time slots or frames to be used for the second data transmission.

In GPRS this RAI can for example be the afore mentioned uplink state flag which directly indicates the timing (e.g. the time slot) at which an uplink transmission is allowable.

Above it was already explained that a timing unit TIM may be provided on the first network site unit BSS to determine the timing at which said first data transmission DT1 is forwarded to said second network site MS as said third data transmission DT3 by said forwarding unit CONV. It may be noted that also this timing can be transmitted as a first data transmission characteristic to said second network site MS for having the transmission resources allocated on the second network site MS based at least based on said timing.

In accordance with another embodiment of the invention it also possible that the resource allocation information RAI is based on the derived timing. Thus, in both afore mentioned cases the second network site MS can determine or allocate transmission resources for the respective uplink or reverse direction (e.g. for acknowledgments) by also considering the timing at which said first data transmission is forwarded by said forwarding unit to said second network site as said third data transmission. For example, the allocation of resources for the uplink does not make sense if the first data transmission has as yet not been forwarded and if the information about the timing is received at the second network site MS then an allocation can be appropriately started.

DESCRIPTION OF THE THIRD EMBODIMENT

In the first and second embodiment the resources for the second data transmission are allocated on the basis of the first transmission characteristic DTC1 or on the basis of a resource allocation information RAI derived therefrom. Hereinafter with reference to FIG. 10a and FIG. 10b a third embodiment of the invention is described in which the resource allocation for the second data transmission DT2 is made dependent also on the transmission characteristic of the second data transmission DT2.

Figure 10A:
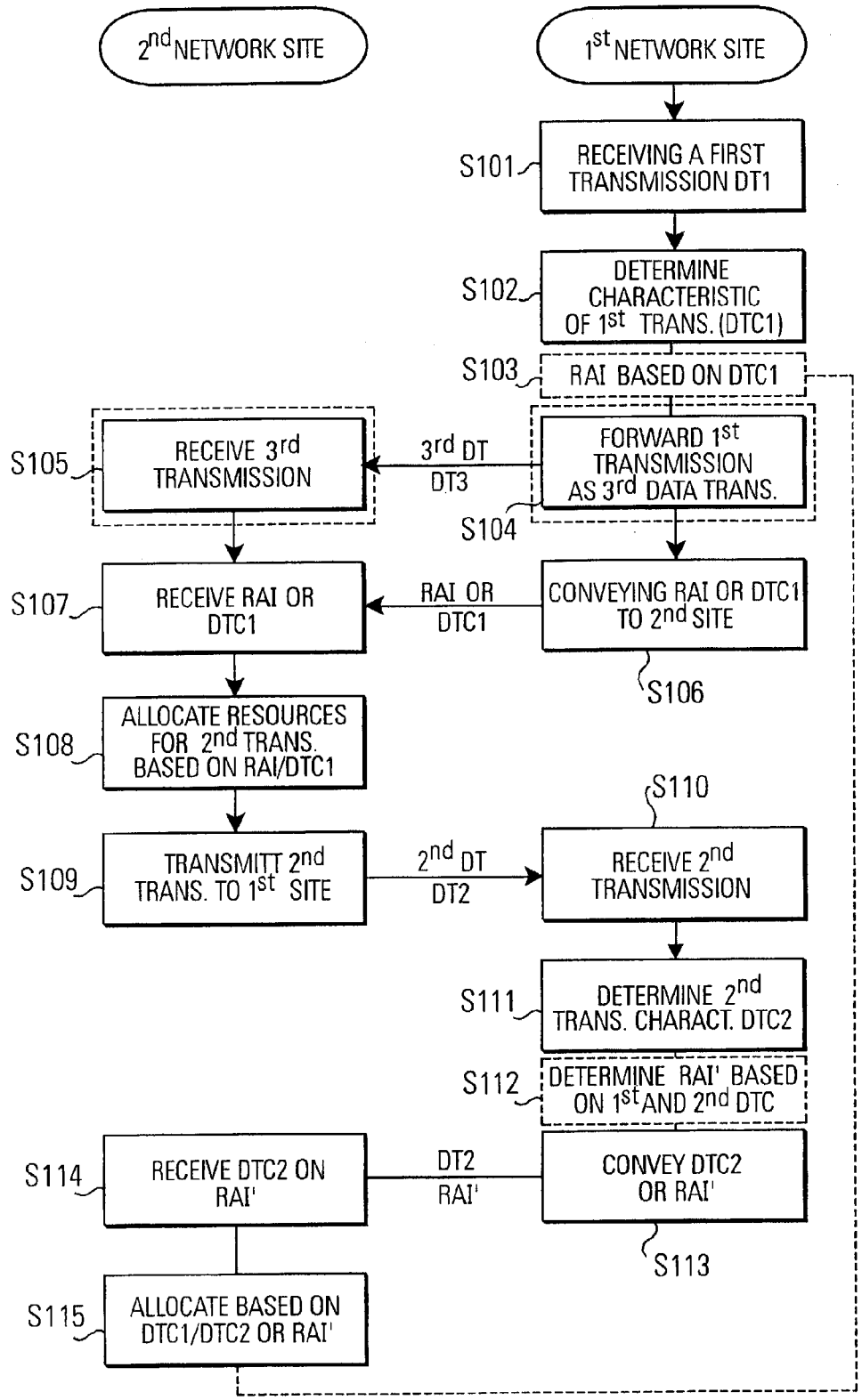
FIG. 10a shows a flowchart of another embodiment of the method in which also a second transmission characteristic information DTC2 is used for the resource allocation on the second network site.

In FIG. 10a, steps S101 to S110 correspond to the respective steps S91-S910 in FIG. 9a or steps S81 to step S810 in FIG. 8a. As shown in step S108 in FIG. 10a the resource allocation for the second data transmission is done based on the first transmission characteristic DTC1 or on the resource allocation information RAI based on this first data transmission characteristic DTC1.

However, as shown in step S111 in FIG. 10a, a second transmission characteristic determiner DET2 (shown in FIG. 10b) is adapted to determine a second transmission characteristic information DTC2 indicating a data transmission characteristic of said second data transmission DT2 received at the first network site BSS. Of course, in accordance with another embodiment of the invention, the first and second determining units DET1, DET2 can be merged into a single transmission characteristic determiner carrying out both function of determining the first and second data transmission characteristic DTC1, DTC2.

As shown in step S113 in FIG. 10a, the second data transmission characteristic DTC2 is also conveyed to the second network site MS and is received there in step S114. In step S115 the allocater ALLO of the second network site MS performs the allocation of the transmission resources for the second data transmission on the basis of said first and second transmission characteristic information DTC1, DTC2. That is, in this embodiment of the invention both the first and second data transmission characteristics DTC1, DTC2 are conveyed to the second network site from the first network site and both of them are used for resource allocation.

In accordance with another embodiment of the invention, as indicated with the optional step S112, a resource allocation information determining unit RAID in the network unit BSS of the first network site can determine a resource allocation information RAI' which is based on the first and the second data transmission characteristic DTC1, DTC2. In this case, step S113 comprises the forwarding of the resource allocation information RAI' to the second network where it is received in step S114. In this case, the allocation step S115 comprises the allocation of radio resources for the second data transmission based on the resource allocation information RAI' which has been derived based on said first and second data transmission characteristic DTC1/DTC2.

Thus, in accordance with the third embodiment of the invention data transmission characteristics of both the first and second transmission DT1, DT2 are used for allocating resources for the second data transmission DT2.

DESCRIPTION OF FURTHER EMBODIMENTS

In the above described first to third embodiments step S82 (FIG. 8a), step S92 (FIG. 9a) and step S102 (FIG. 10a) determine the first data transmission characteristic DTC1 of the first data transmission DT1.

In accordance with another embodiment, this determination can comprise the reception of the first data transmission characteristic information DTC1 at the first network site. That is, the transmission characteristic determiner DET1 simply receives the information DTC1 from the network unit which transmits the first data transmission DT1.

In accordance with another embodiment, the first data transmission characteristic determiner DET1 is adapted to analyse the receive data transmission DT1 for its transmission characteristic. The same likewise applies to the determination of the second data transmission characteristic, i.e. the second data transmission characteristic DTC2 may be received at the first network site from the second network site or the second data transmission DT2 can be analysed for the second data transmission characteristic.

In accordance with another embodiment of the invention, the first data transmission can be a data packet transmission in a data packet transmission network SYS in which case the transmission characteristic determiner DET1 is adapted to determine as said first data transmission characteristic information DTC1 whether data packets are transmitted in said first data transmission DT1.

In accordance with another embodiment of the invention, the second data transmission DT2 comprises acknowledgement information for the data packets transmitted in the first data transmission DT1.

In accordance with another embodiment of the invention, when the data packet transmission, at least the first data transmission DT1, is a data packet transmission, the first data transmission characteristic DTC1 comprises one or more selected from the group consisting of the number of packets, the sequence of data packets, pauses between the data packets, the data packet type indicating the type of the data packet transmitted and the application type indicating the type of application generating the data packet.

For example, the data packets can be TCP data packets as explained above with reference to FIGS. 1-5.

In accordance with another embodiment of the invention, the data transmissions can be application-specific data transmission such as WAP. As in the above described examples in FIGS. 1-7, the first and second data packet transmissions are associated with a data packet transmission request/acknowledgement procedure. As explained above, the first data transmission in the scenario ② in FIG. 6a can for example be the downlink data packet transmission in FIG. 1c. In this case, the second data transmission DT2 could be the uplink acknowledgment information transmission from the TCP terminal to the TCP host. As explained above with reference to FIG. 1c, in such a TCP data transmission network SYS as in FIG. 1c, an uplink and downlink TBF, i.e. a link layer protocol context, has to be established between the first network site and the second network site. The allocation of resources in step S88 in FIG. 8a, step S98 in FIG. 9a and in step S108 and step S115 in FIG. 10a can be a new setup of a TBF or the maintaining of a TBF between the first network site and the second network site.

Figure 1A:
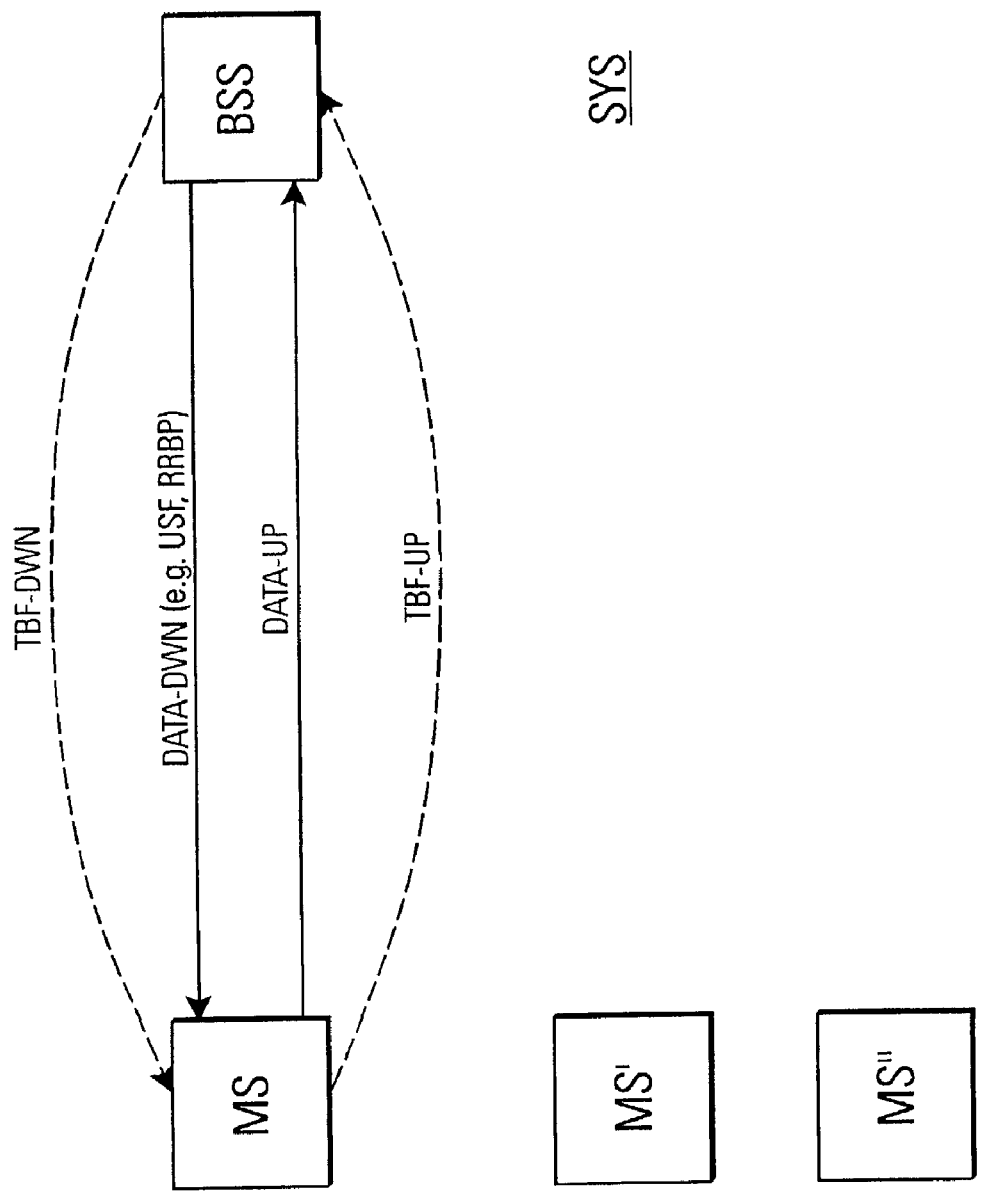
FIG. 1a shows uplink and downlink transmissions between a first network site BSS and a second network site MS, in accordance with the prior art.
Figure 1B:
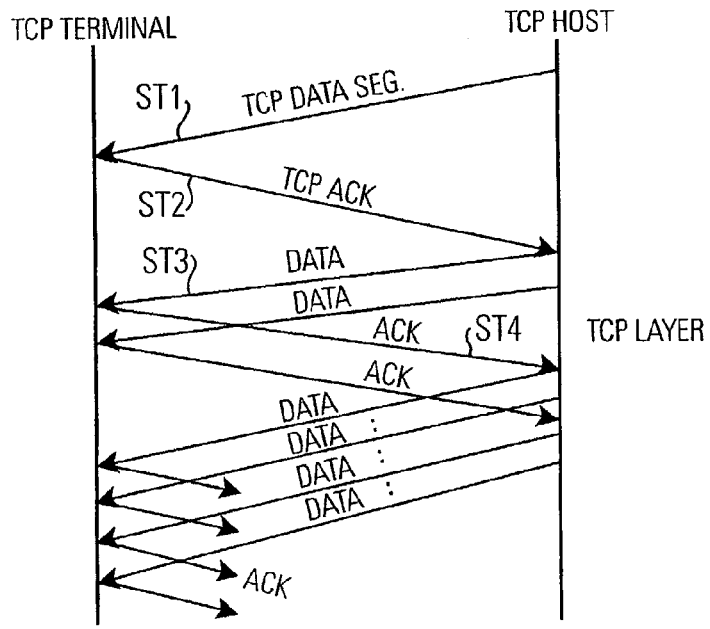
FIG. 1b shows the transmission of data and acknowledgement information between a host and a terminal, in accordance with the prior art.
Figure 1C:
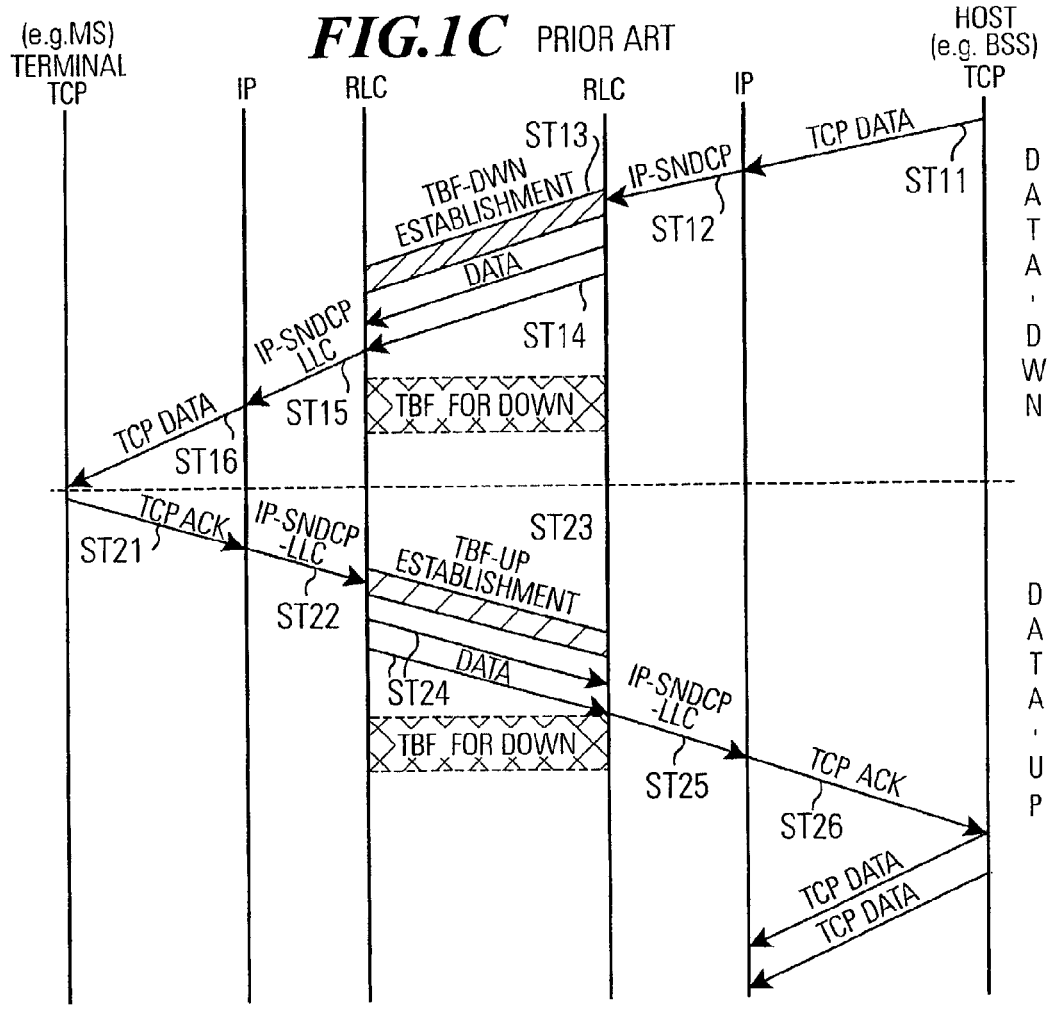
FIG. 1c shows TBF establishment and teardown procedures in the downlink and uplink direction, in accordance with the prior art.

For example, if the allocater ALLO of the second network site MS (the TCP terminal) in FIG. 1c receives information indicating that there are a large number of data packets transmitted from the host to the terminal, the allocater ALLO can decide to maintain the uplink TBF even if at a particular point in time there are no pending acknowledgement data packets at the terminal side (because it can be foreseen that in the near future there will be the need to transmit acknowledgment information from the second network site to the first network site). For example, the allocater ALLO could use the CV value and/or the data transmission characteristics DTC1/DTC2 or DTC3 (or an allocation information RAI based on these characteristics) relating to the first, second and/or third data transmission DT1, DT2, DT3 (if transmitted from the first network site) to decide that there is the need to keep the TBF open. For example, a large CV value definitely indicates that many acknowledgment packets need to be transferred in the uplink. Likewise, the first data transmission characteristic DTC1 (or an allocation information RAI based thereon) may indicate a large number of data packets arriving at the first network site MS and thus the potential need of acknowledgment re-transmissions from the terminal to the host.

If the allocater ALLO in principle has decided that the TBF is to be held open, a transmission resource scheduler can take over the task to perform a scheduling of the resources for the second data transmission DT2 such that the TBF really is kept open as decided. Such a scheduler SCHED for scheduling radio resources for the second data transmission DTC2 can be carried out by the scheduler SCHED shown in FIGS. 8b, 9b and 10b. This scheduling of radio resources for the second data transmission DT2 can be performed based on the counter value CV as was explained above with reference to FIG. 4. However, in accordance other embodiments of the invention, also the first, second and/or third data transmission characteristic DTC1/DTC2 and/or DTC3 (or a resource allocation information RAI based thereon) can be used by the scheduler SCHED to decide on the resource allocation for the uplink, for example on the particular time slots and/or the number of time slots (smallest resource units per time unit) to be used. In turn, the scheduling of the time slots, or more generally of transmission resources for the uplink, will eventually decide whether a larger or a smaller CV value will be generated (and transmitted to the host) and—as explained above—this will in turn determined whether the TBF is maintained or torn down (cf. FIG. 4).

The scheduling of the resources dependent on CV (and/or DTC1/DTC2, DTC3) performed by the scheduler SCHED can determine whether a TBF in the uplink will be maintained or cancelled and thus an optimal allocation of resources or the avoidance of unnecessary use (waste) of resources can be achieved. For example, as was explained above with reference to FIG. 4, the counter value CV which essentially indicates the number of data packets to be transmitted from the second network site to the first network site, causes—in the prior art—a tearing down procedure for the uplink TBF if it indicates a value of $CV \leq 15$. Thus, the allocation of radio resources, i.e. the control of the setup/tear down of the uplink TBF, can be controlled by influencing the counter value CV for example depending on characteristics of the downlink data transmission DT1. There are several embodiments of how the scheduler SCHED performs the allocation of transmission resources, e.g. time slots on the PDTCH (Packet Data Transmission CHannel), on the basis of the CV value (and/or possibly the DCT1/DTC2 and/or DTC3) and the following listing of possibilities should not be taken as limitation. The skilled person can consider numerous other possibilities based on his/her average skills in this technical field:

1. No downlink TBF, CV<15, CV>0: no countdown procedure started.
2. No downlink TBF, CV=0: tear down, final Ack must be sent from BSS. Depending on uplink load situation (e.g. ratio of used/unused radio blocks) and other uplink resources (e.g. USF) the TBF stays open for a certain time period, see below—list point 9.
3. Downlink TBF established, CV>=15: the overall uplink data scheduling (e.g. Round Robin) rules the assignment of blocks.
4. Downlink TBF established, CV<15, state (A): The overall uplink data scheduling (rules the assignment of blocks.
5. Downlink TBF established, CV<15, CV>=7, state (B,C): Schedule×radio blocks for every LLC frame transmitted (i.e. acknowledged) in downlink direction. X∈ {1, 2, 3, 4} (x=ceiling ((n+y)/cps)), n=40 if state A, n=60 if state B, y=overhead by PDCP, cps=payload size depending on modulation and coding scheme.
6. Downlink TBF established, CV<15, CV>=7, state (D): Schedule 1 radio blocks for every LLC frame transmitted (i.e. acknowledged) in downlink direction.
7. Downlink TBF established, CV<7, CV>=0, state (B,C): Schedule×radio blocks for every second LLC frame transmitted (i.e. acknowledged) in downlink direction. X∈ {1, 2, 3, 4} (x=ceiling ((n+y)/cps)), n=40 if state A, n=60 if state B, y=overhead by PDCP, cps=payload size depending on modulation and coding scheme.
8. Downlink TBF established, CV<7, CV>=0, state (D): Schedule 1 radio blocks for every second LLC frame transmitted (i.e. acknowledged) in downlink direction.
9. Downlink TBF established, CV=0: assign radio block every $2^{nd}$, $3^{rd}$, $4^{th}$, $5^{th}$. . . ,[FFS]. After this tear down. Depending on uplink load situation (e.g. ratio of used/unused radio blocks) and other uplink resources (e.g. USF) the period in which the TBF stays open can be extended or shortened. Still, the periodicity (every x-th block) should not extend a certain threshold.

However, a skilled person can based on the above teachings derive other examples of allocating radio resources in the TCP scenarios explained with reference to FIGS. 1-7.

As explained above, the present invention is by no means limited to data transmissions constituted by data packets in a data packet transmission network. Preferred environments in which the invention can be used are a communication network constituted by a mobile radio communication network such as GPRS in which case the network unit of the communication system SYS is a mobile station.

The network unit of the communication network SYS may also be a base station system BSS.

Thus, another embodiment of the invention comprises a communication network including at a first network site a first network unit and at a second network site a second network unit wherein at least one of said first and second network units is constituted as described above.

Furthermore, the invention comprises embodiments which result from a combination of features and steps which have been separately described in the claims and in the description and which may be shown separately in the drawings.

Reference numerals in the claims only serve clarification purposes and do not limit the scope of these claims.

What is claimed is:

1. A method for allocating transmission resources in a data communication network in which data transmissions are carried out between a first network site and a second network site, comprising the following steps:
    a) receiving at said second network site a first data transmission from said first network site having a specific data transmission characteristic;
    b) allocating by said first or second network site transmission resources for a second data transmission in said communication network from said second network site to said first network site, said second data transmission comprising the transmission of acknowledgement data acknowledging the receipt of data of said first data transmission by said second network site;
    c) determining at said first network site a first transmission characteristic information indicating said data transmission characteristic of said first data transmission, wherein in addition to the determining of said first transmission characteristic information, said first network site also determines a second transmission characteristic information indicating a data transmission characteristic of said second data transmission received at said first network site;
    d) allocating by said first or second network site said transmission resources based on at least said first transmission characteristic information;
    wherein said second transmission characteristic information is also conveyed to said second network site; and
    said allocating step d) comprises the allocating of the transmission resources by said second network site for said second data transmission on the basis of said first and second transmission characteristic information.

2. A method for allocating transmission resources in a data communication network in which data transmissions are carried out between a first network site and a second network site, comprising the following steps:
    a) receiving at said second network site a first data transmission from said first network site having a specific data transmission characteristic;
    b) allocating by said first or second network site transmission resources for a second data transmission in said communication network from said second network site to said first network site, said second data transmission comprising the transmission of acknowledgement data acknowledging the receipt of data of said first data transmission by said second network site;
    c) determining at said first network site a first transmission characteristic information indicating said data transmission characteristic of said first data transmission, wherein in addition to the determining of said first transmission characteristic information, said first network site also determines a second transmission characteristic information indicating a data transmission characteristic of said second data transmission received at said first network site;
    d) allocating by said first or second network site said transmission resources based on at least said first transmission characteristic information;
    wherein a resource allocation information based on said first and second transmission characteristic information is conveyed to said second network site; and
    said allocating step d) comprises the allocating of the transmission resources by said second network site for said second data transmission on the basis of said resource allocation information.

3. A network unit at a first network site of a data communication network which provides data communications among at least said first network site and a second network site comprising:
    a) a transmitter adapted to transmit a first data transmission having a specific data transmission characteristic to said second network site;
    b) a receiver adapted to receive a second data transmission from said second network site;
    c) a transmission resource allocater adapted to allocate transmission resources for said second data transmission in said communication network from said second network site to said first network site, said second data transmission comprising the transmission of acknowledgement data acknowledging the receipt of data of said first data transmission by said second network site;
    d) a transmission characteristic determiner adapted to determine a first transmission characteristic information indicating said data transmission characteristic of said transmitted first data transmission wherein said transmission characteristic determiner, in addition to the determining of said first transmission characteristic information, is further adapted to also determine a second transmission characteristic information indicating a data transmission characteristic of said second data transmission received at said first network site;
    said allocater being adapted to allocate said transmission resources based on at least said first transmission characteristic information; and
    wherein said allocater is further adapted to also convey said second transmission characteristic information to said second network site.

4. A network unit at a first network site of a data communication network which provides data communications among at least said first network site and a second network site, comprising:
    a) a transmitter adapted to transmit a first data transmission having a specific data transmission characteristic to said second network site;
    b) a receiver adapted to receive a second data transmission from said second network site;
    c) a transmission resource allocater adapted to allocate transmission resources for said second data transmission in said communication network from said second network site to said first network site said second data transmission comprising the transmission of acknowledgement data acknowledging the receipt of data of said first data transmission by said second network site;

d) a transmission characteristic determiner adapted to determine a first transmission characteristic information indicating said data transmission characteristic of said transmitted first data transmission wherein said transmission characteristic determiner, in addition to the determining of said first transmission characteristic information, is further adapted to also determine a second transmission characteristic information indicating a data transmission characteristic of said second data transmission received at said first network site;

e) said allocater being adapted to allocate said transmission resources based on at least said first transmission characteristic information; and wherein said allocater is further adapted to determine a resource allocation information based on said first and second transmission characteristic information and to convey this resource allocation information to said second network site.

\* \* \* \* \*